US010887517B2

(12) United States Patent
Jung et al.

(10) Patent No.: US 10,887,517 B2
(45) Date of Patent: Jan. 5, 2021

(54) IMAGE STABILIZATION CONTROL DEVICE FOR IMAGING DEVICE

(71) Applicant: DONGWOON ANATECH CO., LTD., Seoul (KR)

(72) Inventors: Kwang Sung Jung, Seoul (KR); Doo Young Yang, Seoul (KR); In Woo Han, Seoul (KR)

(73) Assignee: DONGWOON ANATECH CO., LTD., Seoul (KR)

( * ) Notice: Subject to any disclaimer, the term of this patent is extended or adjusted under 35 U.S.C. 154(b) by 0 days.

(21) Appl. No.: 16/343,930

(22) PCT Filed: Oct. 27, 2016

(86) PCT No.: PCT/KR2016/012113
§ 371 (c)(1),
(2) Date: Apr. 22, 2019

(87) PCT Pub. No.: WO2018/079875
PCT Pub. Date: May 3, 2018

(65) Prior Publication Data
US 2019/0260932 A1  Aug. 22, 2019

(51) Int. Cl.
*H04N 5/232* (2006.01)
*G02B 27/64* (2006.01)

(52) U.S. Cl.
CPC ....... *H04N 5/23248* (2013.01); *G02B 27/646* (2013.01); *H04N 5/232* (2013.01); *G03B 2217/005* (2013.01)

(58) Field of Classification Search
CPC ... H04N 5/23248; H04N 5/232; G02B 27/646
See application file for complete search history.

(56) References Cited

U.S. PATENT DOCUMENTS

| 2004/0085464 | A1* | 5/2004 | Higurashi | ............... G03B 5/00 348/241 |
| 2009/0040320 | A1* | 2/2009 | Hirayama | .......... H04N 5/23248 348/208.5 |

(Continued)

FOREIGN PATENT DOCUMENTS

| CN | 101470318 A | 7/2009 |
| CN | 101750755 A | 6/2010 |

(Continued)

OTHER PUBLICATIONS

International Search Report dated Jul. 25, 2017, issued to International Application No. PCT/KR2016/012113.

(Continued)

*Primary Examiner* — Sinh Tran
*Assistant Examiner* — Zhenzhen Wu
(74) *Attorney, Agent, or Firm* — Stein IP, LLC

(57) ABSTRACT

The present invention relates to an image stabilization control device for an imaging device, the image stabilization control device stabilizing the shaking of a subject, caused by vibration applied to an imaging device, and comprising: filters for outputting rotational angular speed data in which a low-frequency component is removed from a rotational angular speed outputted from each of vibration detection sensors of an imaging device according to filter coefficients, which are variably set; a lens moving distance calculation unit processing output signals of the filters so as to calculate a lens moving distance; and a filter coefficient variable control unit for varying the filter coefficients of the filters in order to increase a lens return speed in a lens movement limited area, when the lens moving distance outputted from the lens moving distance calculation unit goes beyond the lens movement limit area having been virtually set.

9 Claims, 3 Drawing Sheets

(56) References Cited

U.S. PATENT DOCUMENTS

| | | | | |
|---|---|---|---|---|
| 2009/0086033 A1* | 4/2009 | Watanabe | ............... | G03B 5/00 |
| | | | | 348/208.2 |
| 2009/0161237 A1* | 6/2009 | Nagata | ................... | G03B 5/00 |
| | | | | 359/814 |
| 2010/0149351 A1* | 6/2010 | Tanaka | .............. | H04N 5/23248 |
| | | | | 348/208.5 |
| 2010/0265341 A1 | 10/2010 | Hirayama et al. | ......... | 348/208.1 |

FOREIGN PATENT DOCUMENTS

| | | |
|---|---|---|
| KR | 10-2007-0040547 A | 4/2007 |
| KR | 10-0741791 B1 | 7/2007 |
| KR | 10-0855370 B1 | 9/2008 |
| KR | 10-0990270 B1 | 10/2010 |
| KR | 10-1288945 B1 | 7/2013 |

OTHER PUBLICATIONS

Chinese Office Action dated Jun. 1, 2020, issued to Chinese Application No. 201680090484.0.

\* cited by examiner

IMAGE STABILIZATION CONTROL DEVICE FOR IMAGING DEVICE

CROSS-REFERENCE TO RELATED APPLICATIONS

This application is a national stage of International Application No. PCT/KR2016/012113, filed Oct. 27, 2016, filed in the Korean Intellectual Property Office, the disclosure of which is incorporated herein by reference.

TECHNICAL FIELD

This present invention relates to an imaging device such as a camera, and more particularly, to an image stabilization control device of an imaging device for stabilizing sway of a subject due to vibration applied to the imaging device.

BACKGROUND ART

Imaging devices such as cameras installed on smart phones and digital cameras implement high image quality by increasing the number of pixels of an imaging element. An image stabilization (optical image stabilization) function is generally provided in a high image quality and high-end imaging device so as to correct swaying of a subject due to sway of a hand.

For reference, a vibration component delivered to the imaging device is very complicated and diverse. Corrections for vibration due to sway are generally limited to a camera structure and a design of a controller. Among the corrections, a correction of movement due to panning or tilting is processed by being classified into a phenomenon different from general sway vibration.

Distinguishable vibration in the imaging device can be classified into vibration of a low frequency component due to sway of a hand, and large vibration (panning and tilting) out of a movement range of a lens. Additionally, to describe a process of correcting movement against the large vibration out of the movement range of the lens among the distinguishable vibration, a range of image compensation for vibration is designed such that the lens is mechanically compensable within a maximally movable position A (which is defined as a maximal movement position of the lens) based on a central position B (which may be referred to as a reference position).

For example, as shown in FIG. 1, when a vibration waveform 20 is input up until a position P out of the maximal movement position A of the lens, the lens is moved to the maximal movement position A of the lens, which is mechanically designed and then is fixed thereat until a vibration waveform from the position P to a position p' is input. As described above, when the lens is moved to a position C and then a position of the lens is fixed thereat in response to the vibration wave input up until the position P, a consumption current for fixing the lens is continuously applied such that there occurs a problem in that the consumption current increases.

Further, when a new vibration waveform 30 is input in a state in which the lens is moved to the position C and then fixed thereat, compensation for a vibration component with respect to a position S' (which is the position within the maximal movement position A of the lens) is possible. However, since the lens is not further moved, a vibration component of a position S out of the maximal movement position A causes a different feeling of an image due to non-compensation. That is, in a general imaging device, when the lens is moved to the maximal movement position A thereof, the lens cannot react immediately to an input of another vibration component such that there occurs a case in which another vibration component cannot be compensated for.

PRIOR ART DOCUMENT

Patent Document

U.S. Patent Application Publication No. 2010-0265341 A1

SUMMARY OF INVENTION

Technical Problem

The present invention is directed to providing an image stabilization control device for an imaging device, which is designed to be able to normally response to a vibration component, which is subsequently input, by setting an imaginary lens movement limit area and, when a lens is away from the set imaginary lens movement limit area due to generation of panning and tilting phenomena, rapidly returning the lens to a lens movement limit area (more specifically, a central position).

Further, the present invention is directed to providing an image stabilization control device for an imaging device which is capable of controlling a return speed of a lens when the lens is returned into a lens movement limit area thereof.

Solution to Problem

One aspect of the present invention provides an image stabilization control device for an imaging device which includes filters configured to output rotational angular velocity data in which a low frequency component is removed from a rotational angular velocity output from each of vibration detection sensors for detecting vibration of the imaging device according to filter coefficients which are varied and set, a lens moving distance calculation unit configured to process an output signal of each of the filters to calculate a lens moving distance, and a filter coefficient variable control unit configured, when the lens moving distance output from the lens moving distance calculation unit is out of an imaginary lens movement limit area, to vary the filter coefficients so as to increase a return speed of a lens into the lens movement limit area.

The lens moving distance calculation unit may include integrators configured to integrate the rotational angular velocity data of each of the filters to output angle signals, each indicating a movement amount of the lens due to a panning or tilting phenomenon, high pass filters configured to attenuate the angle signals which are outputs of the integrators according to filter coefficients which are varied and set by the filter coefficient variable control unit, and a gain processor configured to apply a weight value to an angle signal which is an output of each of the high pass filters and convert the angle signal into the lens moving distance to output the lens moving distance.

In the image stabilization control device according to embodiments of the present invention, the filter coefficients of the filters and the high pass filters, which are varied and set when the lens is away from the imaginary lens movement limit area, may each be set to a value in a range of 10 to 150 times a value of the filter coefficient before the variable setting to flexibly control the return speed of the lens.

The filter coefficient variable control unit of the image stabilization control device for an imaging device according to the embodiments of the present invention may further include a memory in which filter coefficients for the variable setting are stored, and the filter coefficients stored in the memory may have different values according to an operation mode of the imaging device, e.g., a picture mode, a moving image mode, or a panorama mode.

Advantageous Effects of Invention

In accordance with an image stabilization control device for an imaging device according to embodiments of the present invention, an imaginary lens movement limit area of a lens is set within a range of a maximal movement position at which the lens can be moved, and, when the lens which is moved to correct vibration due to panning and tilting is away from the imaginary lens movement limit area of a lens, filter coefficients of filters are immediately set to be variable so as to return the lens to a central position thereof such that there is an effect of being capable of stably correcting minute vibration due to subsequently input sway of a hand.

Further, in accordance with the image stabilization control device for an imaging device according to the embodiments of the present invention, it is possible to prevent a case in which the lens is moved to the maximal movement position thereof and then a position of the lens is fixed so as to correct a vibration component due to the panning and the tilting such that there is an effect of being capable of preventing unnecessary current consumption.

Furthermore, in accordance with the image stabilization control device for an imaging device according to the embodiments of the present invention, one or more imaginary lens movement limit areas of a lens are set within a position range in which the lens can be maximally moved, and a filter coefficient is set differently according to the one or more set imaginary lens movement limit areas such that there is an advantage of being capable of controlling a return speed of the lens to a central position. Since various filter coefficients can be stored in an internal memory and used, it is possible to achieve an effect of being capable of reducing power consumption due to a small processing operation and reducing a development cost due to not using high performance hardware.

DETAILED DESCRIPTION OF EMBODIMENT

Figure 1:
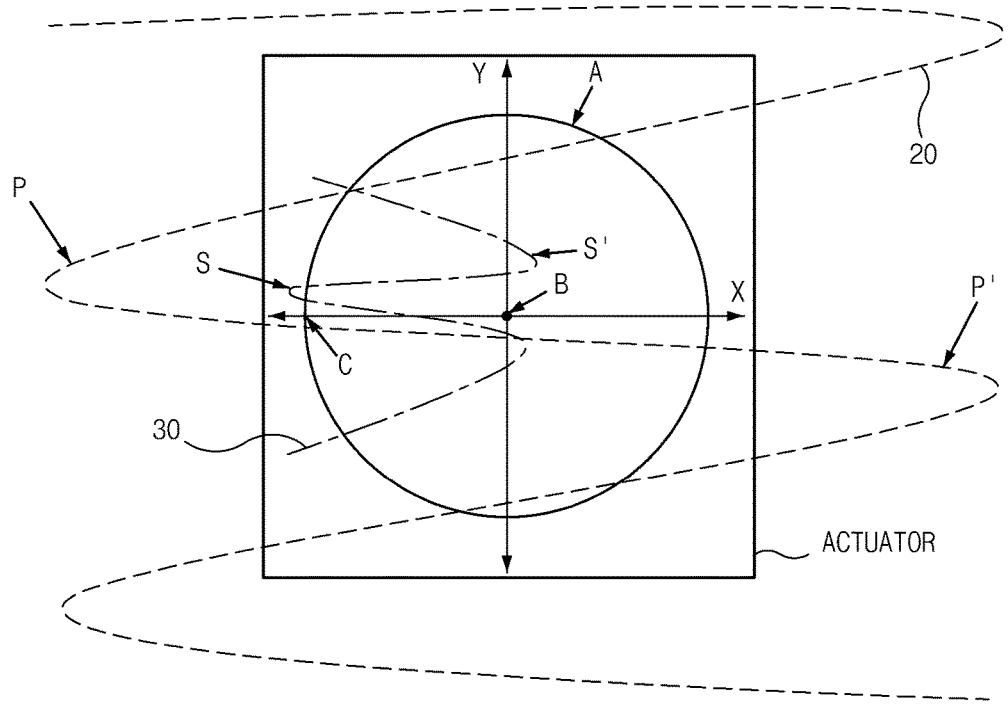
FIG. 1 is a diagram for describing a relationship between a maximal movement position A of a lens and a waveform of a vibration component based on a central position B of the lens of a camera actuator which is an imaging device.

Specific structural and functional descriptions of the embodiments of the present invention disclosed herein are illustrative only for the purpose of describing the embodiments according to the concept of the present invention, and these embodiments according to the concept of the present invention may be implemented in various forms and should not be construed as being limited to embodiments described herein.

Further, the embodiments according to the concept of the present invention may be variously modified and may have various forms so that these embodiments may be illustrated in the drawings and described in detail herein. It should be understood, however, that the embodiments are not intended to limit the embodiments according to the concept of the present invention to specific disclosure forms but include all modifications, equivalents, and substitutions falling within the spirit and scope of the present invention.

Further, in the following description of the embodiments of the present invention, if a detailed description of related known functions or configurations is determined to obscure the gist of the present invention, the detailed description thereof will be omitted.

Figure 2:
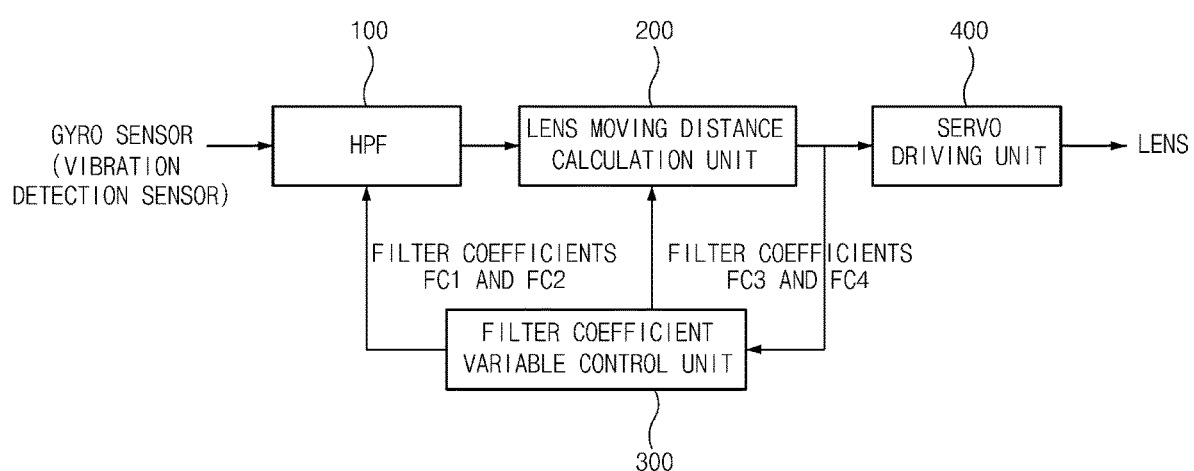
FIG. 2 is an exemplary block diagram illustrating an image stabilization control device of an imaging device according to an embodiment of the present invention.
Figure 3:
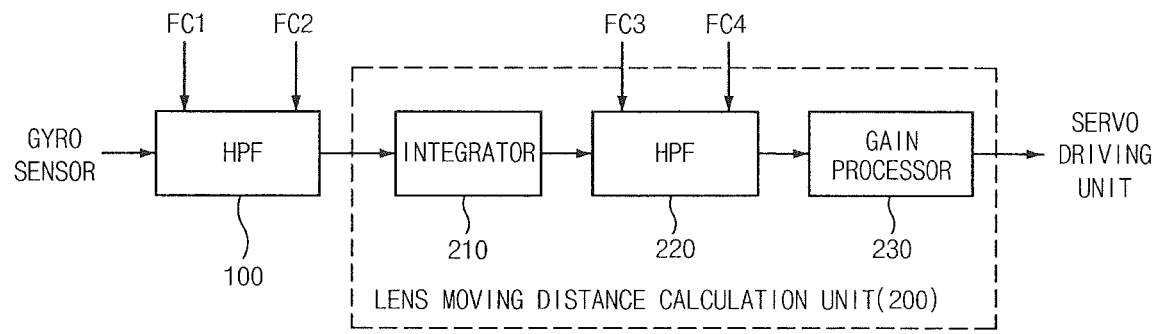
FIG. 3 is an exemplary diagram illustrating a detailed configuration of a lens moving distance calculation unit shown in FIG. 2.

FIG. 2 illustrates a block diagram of an image stabilization control device for an imaging device according to an embodiment of the present invention, and FIG. 3 illustrates a detailed configuration of a lens moving distance calculation unit 200 shown in FIG. 2.

Referring to FIG. 2, the image stabilization control device for an imaging device according to the embodiment of the present invention is disposed to operate between a servo driving unit 400 and a vibration detection sensor (e.g., a gyro sensor) for detecting a rotational angular velocity due to vibration of the imaging device. In FIG. 2, only one gyro sensor is shown as a vibration detection sensor. However, it is obvious that a plurality of gyro sensors are provided in the imaging device, such as a camera, so as to detect a rotational angular velocity in each of directions perpendicular to each other (yaw and pitch axes).

Figure 4:
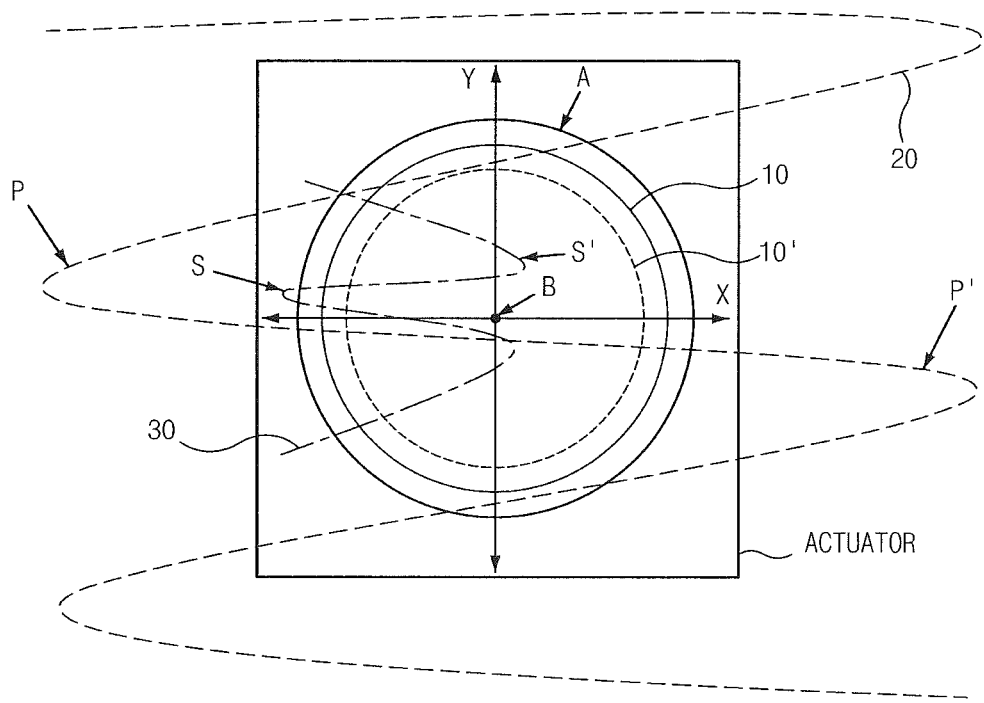
FIG. 4 is a diagram illustrating an imaginary lens movement limit area 10 and a maximal movement position A of a lens according to an embodiment of the present invention.

The image stabilization control device for an imaging device, which is disposed between the gyro sensor and the servo driving unit 400, includes filters 100 for outputting rotational angular velocity data in which a low frequency component is removed from a rotational angular velocity output from each of vibration detection sensors of the imaging device according to filter coefficients FC1 and FC2 which are varied and set, a lens moving distance calculation unit 200 for processing output signals of the filters 100 to calculate a lens moving distance, and a filter coefficient variable control unit 300 configured, when the lens moving distance output from the lens moving distance calculation unit 200 is away from an imaginarily set lens movement limit area 10 of FIG. 4, to vary filter coefficients of the filters 100 (from FC1 to FC2) so as to increase a return speed of the lens into the lens movement limit area 10. The lens movement limit area 10 may be set at 60 to 80% positions of the maximal movement position A of the lens based on a central position of the lens.

For reference, the filters 100 disposed behind the gyro sensor are high-pass filters (HPFs) of which filter coefficients are varied by the filter coefficient variable control unit 300, and cutoff frequencies of the filters 100 are varied according to the variable filter coefficients such that the filters 100 remove drift components of low frequency components. The filters 100 implementable with HPFs may be classified by the filter coefficient FC1 which is set to correct sway of a hand and the filter coefficient FC2 which is set to correct vibration components of panning and tilting. The FC2 is a filter coefficient that is varied and set so as to return the lens into the lens movement limit area 10 when the lens is away therefrom, in order to control a return speed, the FC2 may be set to a value before a filter coefficient is varied and set, i.e., a value in the range of 10 to 150 times the filter coefficient FC1 for correcting the sway of the hand.

Meanwhile, the lens moving distance calculation unit 200 for calculating the moving distance of the lens includes integrators 210 for integrating the rotational angular velocity data of the filters 100 to output angle signals, each indicating a movement amount of the lens due to a panning or tilting phenomenon, HPFs 220 for attenuating the angle signals which are outputs of the integrators 210 according to filter coefficients FC3 and FC4 which are set to be varied by the filter coefficient variable control unit 300, and a gain processor 230 for applying a weight value to the angle signal output from each of the HPFs 220 to convert the angle signal into a lens moving distance and output the lens moving distance.

When the lens is away from the lens movement limit area 10, the HPFs 220 in the lens moving distance calculation unit 200 are also set to be varied from the filter coefficient FC3 for correcting the sway of the hand to the filter coefficient FC4 for correcting the vibration component of the tilting. The variably set filter coefficient FC4 is set to a value in the range of 10 to 150 times the filter coefficient value FC3 before the variable setting, thereby being used to flexibly adjust the return speed of the lens.

Meanwhile, the filter coefficient control unit 300 includes a memory in which the filter coefficients FC1 to FC4 for the variable setting are stored. The filter coefficients FC1 to FC4 stored in the memory may have different values according to operation modes of the imaging device, e.g., a picture mode, a moving picture mode, and a panorama mode, and the values of the filter coefficients may each be set to be larger in the order of modes in which movement is large (the moving picture mode>the panorama mode>the picture mode).

Alternatively, one or more lens movement limit areas 10 which are imaginarily settable may be set within a range of the maximal movement position A of the lens based on the central position B of the lens, and in this case, the filter coefficient variable control unit 300 may vary the filter coefficients of the filters 100 and 200 for each of the plurality of lens movement limit areas 10, and a value of each of the filter coefficients thereof may be set to have a large value as being away from the central position B of the lens. Further, when a plurality of lens movement limit areas 10 and 10' are set, the filter coefficients of the filters may be varied for each of to the plurality of lens movement limit areas 10 and 10', and In the same lens movement limit area, the filter coefficients thereof may be set to be linearly varied according to a variation from the central position of the lens (to be increased as a distance increases).

The servo driving unit 400, which is not described, generates and outputs a signal for moving the lens according to the lens moving distance output from the lens moving distance calculation unit 200.

An operation of the image stabilization control device of the imaging device according to the embodiment of the present invention will be described below with reference to FIGS. 4 and 5.

Figure 5:
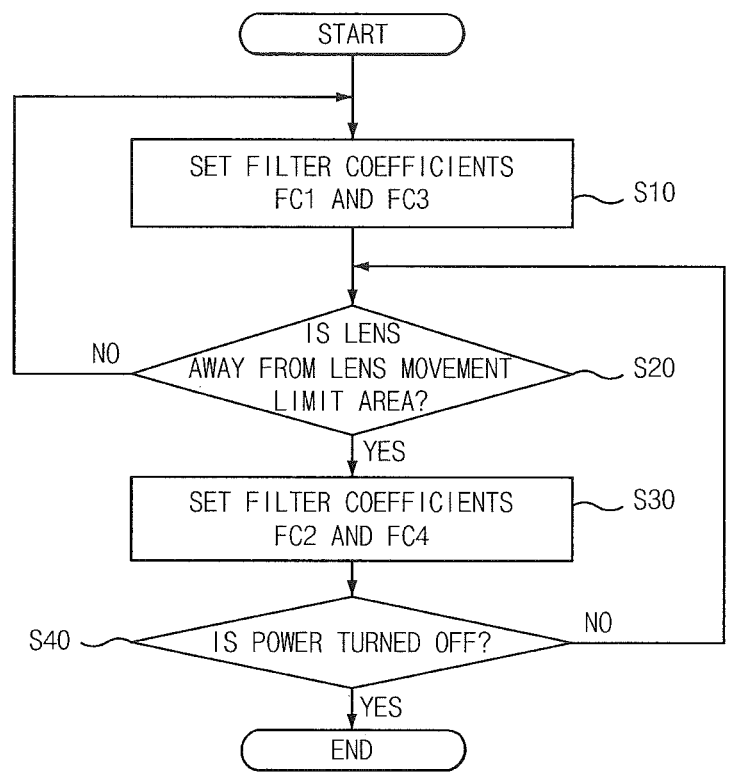
FIG. 5 is a flowchart for describing an operation of the image stabilization control device of the imaging device according to the embodiment of the present invention.

FIG. 4 is a diagram illustrating the imaginary lens movement limit area 10 of the lens and the maximal movement position A of the lens according to the embodiment of the present invention, and FIG. 5 is a flowchart for describing an operation of the image stabilization control device of the imaging device according to the embodiment of the present invention.

Referring to FIG. 5, when a camera lens is located at the central position B or within the lens movement limit area 10 of the lens as shown in FIG. 4, the filter coefficients of the filters 100 and 220 are assumed to be set to FC1 and FC3, respectively (S10).

Under this assumption, as shown in FIG. 4, when a waveform 20 of a large vibration component (which is also referred to as a vibration component of panning or tilting in some cases) out of a compensation range of the lens is input from the gyro sensor which is the vibration detection sensor, a rotational angular velocity according to the input waveform 20 is output. Thus, the HPF 100 removes a low frequency component from the rotational angular velocity output from each of the gyro sensors according to a cutoff frequency based on the set filter coefficient FC1 and then outputs the rotational angular velocity.

The lens moving distance calculation unit 200 performs an integration processing and an attenuation processing on the rotational angular velocity output from the HPF 100 to calculate and output a lens moving distance which will be compensated for. The servo driving unit 400 moves the lens according to the lens moving distance, and the filter coefficient control unit 300 checks whether the lens is away from the imaginary lens movement limit area 10 on the basis of the input lens moving distance (S20).

When the lens moved by the lens moving distance which will be compensated for by the vibration components of the panning and tilting is located within the lens movement limit area 10, the vibration components may be ignored. However, when the lens is away from the imaginary lens movement limit area 10 of the lens in order to compensate for the vibration components according to the vibration waveform 20 as shown in FIG. 4, a relatively small vibration waveform such as sway of a hand may not be compensated for normally. In order to solve the above-described problem, it is necessary to rapidly return the lens into the lens movement limit area 10, more specifically, to the central position B.

Thus, when the lens is away from the imaginary lens movement limit area 10, the filter coefficient variable control unit 300 of the present invention proceeds to operation S30 to control the filter coefficients of the HPF 100 and the HPF 220 in the lens moving distance calculation unit 200 to be varied and set to FC2 and FC4.

The filter coefficients FC2 and FC4, which are newly varied and set, are set to values in the range of 10 to 150 times larger than the filter coefficients FC1 and FC3 before the variable setting to be used to flexibly control the return speed of the lens.

That is, when the filter coefficient of the HPF 100 is set to be large as the filter coefficient FC2, a rotational angular velocity value that is relatively smaller than the filter coefficient FC1 is input to the integrator 210 and accumulated. When the filter coefficient of the HPF 220 is set to the filter coefficient FC4 that is greater than the filter coefficient FC3, an attenuation width of the angle signal which is accumulated and output from the integrator 210 is increased relatively to rapidly return the lens in a direction of the central position. As described above, the filter coefficient of the HPF 220 is set to the filter coefficient FC4 for correcting the vibration components due to the panning and tilting phenomena from the filter coefficient FC3 for correcting the sway of the hand. When the filter coefficient is controlled, the return speed of the lens to the central position may also be controlled.

As described above, when the filter coefficients of the filters 100 and 220 are varied and set to FC2 and FC4 from FC1 and FC3, respectively, the lens which is away from the imaginary lens movement limit area 10 is moved thereinto. When the lens is checked as being moved into the lens movement limit area 10, the filter coefficient variable control unit 300 varies and sets to FC1 and FC3 for correcting the sway of the hand again, thereby assisting the lens to respond in response to the vibration waveform 30 of minute sway of the hand.

Consequently, the image stabilization control device for an imaging device according to the embodiments of the present invention is a useful invention designed such that the imaginary lens movement limit area 10 of a lens is set within a range of a maximal movement position at which the lens is movable, and, when the lens moved to correct vibration due to panning or tilting is away from the imaginary lens movement limit area 10 of a lens, filter coefficients of filters are immediately varied and set so as to return the lens to the central position B such that minute vibration due to subsequently input sway of a hand can be stably prevented (generation of a different feeling of an image can be prevented).

Further, in accordance with the present invention, it is possible to prevent a case in which the lens is moved to the maximal movement position A and then a position of the lens is fixed so as to correct vibration components due to the panning and the tilting such that there is an effect of being capable of preventing unnecessary current consumption.

Furthermore, in accordance with the embodiments of the present invention, one or more imaginary lens movement limit areas 10 of a lens is set within a position range in which the lens can be maximally moved, and a filter coefficient is set differently according to the one or more set imaginary lens movement limit areas A such that there is an advantage of being capable of controlling a return speed of the lens to a central position thereof. Since various filter coefficients can be stored in an internal memory and used, it is possible to achieve an effect of being capable of reducing a load processing burden due to unnecessary arithmetic operation and power consumption due to a small processing operation and reducing a development cost due to not using high performance hardware.

While the present invention has been described with reference to the embodiments shown in the drawings, these embodiments are merely illustrative, and it should be understood that various modifications and equivalent other embodiments can be derived by those skilled in the art to which the present invention pertains. Therefore, the true technical scope of the present invention should be defined by the appended claims.

What is claimed is:

1. An image stabilization control device for an imaging device, comprising:
    a plurality of filters configured to output rotational angular velocity data in which a low frequency component is removed from a rotational angular velocity output from each of vibration detection sensors of the imaging device according to filter coefficients which are set variable;
    a lens moving distance calculation unit configured to process an output signal of each of the filters to calculate a lens moving distance; and
    a filter coefficient variable control unit configured, when the lens moving distance output from the lens moving distance calculation unit is out of a lens movement limit area which is imaginarily set, to vary the filter coefficients of the filters so as to increase a return speed of a lens into the lens movement limit area,
    wherein first filters of the plurality of filters are classified by a first filter coefficient FC1 of the filter coefficients which is set to correct sway of a hand and a second filter coefficient FC2 of the filter coefficients which is set to correct vibration components of panning and tilting, and
    wherein, when the lens is away from the lens movement limit area, second filters of the plurality of filters in the lens moving distance calculation unit are set to be varied from a third filter coefficient FC3 of the filter coefficients for correcting the sway of the hand to a fourth filter coefficient FC4 of the filter coefficients for correcting the vibration component of the tilting.

2. The image stabilization control device of claim 1, wherein the lens moving distance calculation unit includes:
    integrators configured to integrate the rotational angular velocity data of each of the plurality of filters to output angle signals, each indicating a movement amount of the lens due to a panning or tilting phenomenon;
    the second filters configured to attenuate the angle signals which are outputs of the integrators according to the third filter coefficient FC3 and the fourth filter coefficient FC4 which are varied and set by the filter coefficient variable control unit; and
    a gain processor configured to apply a gain to an angle signal which is an output of each of the second filters and convert the angle signal into the lens moving distance to output the lens moving distance.

3. The image stabilization control device of claim 2, wherein the fourth filter coefficient FC4 of the second filters, which is varied and set when the lens is away from the imaginary lens movement limit area, is set to a value in a range of 10 to 150 times a value of the third filter coefficient FC3 before a variable setting by the filter coefficient variable control unit to flexibly control the return speed of the lens.

4. The image stabilization control device of claim 2, wherein the first filters disposed behind each of the vibration detection sensors are high pass filters of which filter coefficients are varied by the filter coefficient variable control unit.

5. The image stabilization control device of claim 2, wherein:
    the filter coefficient variable control unit includes a memory in which filter coefficients which are varied and set by the filter coefficient variable control unit are stored; and
    the filter coefficients stored in the memory have different values according to each of operation modes of the imaging device.

6. The image stabilization control device of claim 1, wherein the fourth filter coefficient FC4 of the second filters, which are varied and set when the lens is away from the imaginary lens movement limit area, are each set to a value in a range of 10 to 150 times a value of the third filter coefficient FC3 before a variable setting by the filter coefficient variable control unit to flexibly control the return speed of the lens.

7. The image stabilization control device of claim 1, wherein:
    a plurality of the imaginary lens movement limit areas are set within a range of a maximal movement position of the lens based on a central position of the lens; and the filter coefficient variable control unit varies the filter coefficients of the plurality of filters according to each of the plurality of the imaginary lens movement limit areas.

8. The image stabilization control device of claim 7, wherein:
the plurality of the imaginary lens movement limit area are set within the range of the maximal movement position of the lens based on the central position of the lens; and
the filter coefficient variable control unit varies the filter coefficients of the plurality of filters according to the plurality of the imaginary lens movement limit areas, and the filter coefficient variable control unit linearly varies the filter coefficients of the plurality of filters according to a variation from the central position of the lens in the same imaginary lens movement limit area.

9. The image stabilization control device of claim 1, wherein the lens movement limit area is set to a 60 to 80% position of a maximal movement position of the lens based on a central position of the lens.

* * * * *